UNITED STATES PATENT OFFICE.

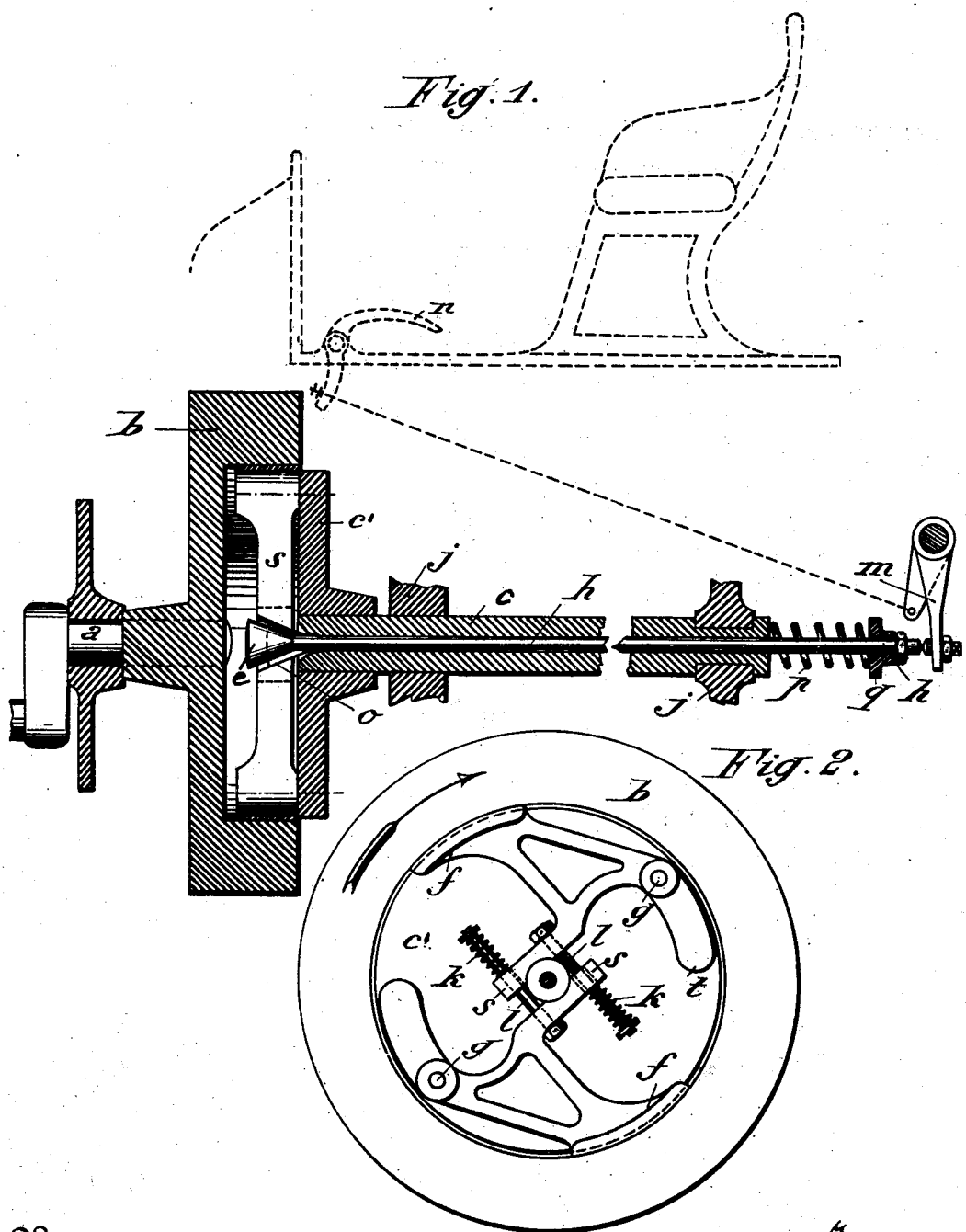

ALEXIS EDOUARD VIVINUS, OF BRUSSELS, BELGIUM.

CLUTCH.

SPECIFICATION forming part of Letters Patent No. 696,284, dated March 25, 1902.

Application filed September 16, 1901. Serial No. 75,574. (No model.)

*To all whom it may concern:*

Be it known that I, ALEXIS EDOUARD VIVINUS, a subject of the King of the Belgians, and a resident of Brussels, Belgium, have invented certain new and useful Improvements in Clutches, of which the following is a specification.

The object of the present invention is a new friction-clutch which can be thrown into or out of gear without exerting any pressure toward the shafts to be acted upon.

In the accompanying drawings, Figure 1 is a section of the clutch, taken through the two shafts it is desired to operate upon. Fig. 2 is a front view of the principal parts of the clutch.

To the driving-shaft $a$ is keyed a fly-wheel $b$, provided with a cylindrical cavity in which are placed the operating parts of the clutch. The shaft to be driven, $c$, supported in bearings $j$, is hollow and carries on its end opposite to the fly-wheel $b$ a disk $c'$, to which are connected, by means of pivots $g$, two brake-blocks $f$, arranged in the said fly-wheel $b$. These brake-blocks $f$ are each provided with an arm $s$, placed near the center of the disk $c'$. These arms are brought near each other by means of coiled springs $k$, placed on bolts $l$, which pass through holes made in the two arms $s$. The springs $k$ therefore have a tendency to prevent the clutch-blocks $f$ from bearing against the fly-wheel $b$. In the hollow of the shaft $c$ is placed a spindle $h$, provided with a conical end $e$, placed between the two arms $s$. This end is constantly pressed against the arms by a spring $p$, bearing on the one hand against the end of the shaft $c$ and on the other hand against a stop-nut $q$, screwed to the shaft $h$.

By the action of the spring $p$ the brake-blocks are constantly held against the inner cylindrical surface of the fly-wheel, which determines the clutch action.

To throw out of gear, it is necessary only to push the rod $h$ toward the fly-wheel in order to disengage the cone $o$ of the arms $s$ and to allow the spring $k$ to approach the said arms $s$. This pushing force may be exerted on the spindle $h$ by means of a stop-lever $m$, actuated by means of a pedal $n$, placed within the driver's reach.

The clutch-blocks are lengthened beyond the pivot $g$, and each carries a balance-weight the object of which is to equalize the effect of the centrifugal force, which without the balance-weights would overcome the action of the springs $k$ and apply the clutch-blocks against the fly-wheel.

Having fully described my invention, what I claim, and desire to secure by Letters Patent, is—

1. In a device of the character described, a hollow fly-wheel keyed to the crank-shaft, a hollow shaft, a disk keyed to said shaft, a spindle operating in the said hollow shaft having a conical end, clutch-blocks having weighted ends pivoted to the said disk, arms connected to said clutch-blocks, spiral springs, bolts having said springs mounted thereon connected to the arms, the said arms having cone-shaped openings formed therein, and means whereby said spindle is moved laterally to cause the cone carried thereby to disengage from the cone-shaped openings in said arms and cause the clutch-blocks to disengage from the inner circumference of said hollow fly-wheel, substantially as described.

2. In a device of the character described, a hollow fly-wheel keyed to the crank-shaft, a hollow shaft having a spindle operating therein, a disk on the hollow shaft, a conical end on said spindle, a pair of clutch-blocks each carrying an arm pivoted to said disk, bolts passing through each of said arms and having springs mounted thereon, said arms having cone-shaped openings formed therein for engagement with said cone carried by the end of the spindle, and a spring mounted on the spindle and engaging the hollow shaft for normally holding the conical end of the spindle in engagement with the arms, and means for operating the spindle, substantially as described.

In testimony whereof I have hereunto set my hand in presence of two witnesses.

ALEXIS EDOUARD VIVINUS.

Witnesses:
   C. S. SCHYE,
   GREGORY PHELAN.